(12) United States Patent
Perakis (10) Patent No.: US 7,150,491 B2
(45) Date of Patent: Dec. 19, 2006

(54) RETRACTABLE ROOF FOR PASSENGER VEHICLES, ESPECIALLY A HARD TOP FOR CONVERTIBLES, ROADSTERS OR SIMILAR

(76) Inventor: Petros Perakis, Kantstrasse 131, Berlin (DE)

( * ) Notice: Subject to any disclaimer, the term of this patent is extended or adjusted under 35 U.S.C. 154(b) by 88 days.

(21) Appl. No.: 10/507,796

(22) PCT Filed: Mar. 7, 2003

(86) PCT No.: PCT/DE03/00807

§ 371 (c)(1),
(2), (4) Date: Sep. 13, 2004

(87) PCT Pub. No.: WO03/076221

PCT Pub. Date: Sep. 18, 2003

(65) Prior Publication Data

US 2005/0104412 A1    May 19, 2005

(30) Foreign Application Priority Data

Mar. 12, 2002  (DE) ............................... 102 12 575

(51) Int. Cl.
*B60J 7/08* (2006.01)
(52) U.S. Cl. .............................. 296/107.2; 296/107.08; 296/107.16; 296/107.17; 296/107.18; 296/107.19
(58) Field of Classification Search ........... 296/107.01, 296/107.03, 107.07, 107.08, 107.14, 107.16, 296/107.17, 107.18, 107.19, 107.2, 116
See application file for complete search history.

(56) References Cited

U.S. PATENT DOCUMENTS 2,768,024 A * 10/1956 Spear, Jr. ............... 296/107.18

(Continued)

FOREIGN PATENT DOCUMENTS

DE        102 12 575 B    3/2002

(Continued)

*Primary Examiner*—D. Glenn Dayoan
*Assistant Examiner*—Greg Blankenship
(74) *Attorney, Agent, or Firm*—Andrew Wilford (57) ABSTRACT

The invention relates to a retractable roof for passenger vehicles, especially a hard top for two-seater convertibles, roadsters or similar, comprising a dimensionally stable shell consisting of a roof part and rear support pillars which are rigidly connected to the roof part at an obtuse angle, a rear window for a window opening and an accommodating area located perpendicular to the longitudinal axis of the vehicle directly behind the seats, wherein the roof part can be moved in and out with the support columns thereof by means of guiding and drive means. The roof part is kinematically and restrictively guided on a guide track with the support pillars thereof. The aim of the invention is to provide a retractable roof of the above-mentioned variety which exhibits the required structural rigidity yet which is lightweight, operates smoothly and is mechanically simply and easy to use while at the same time being compact. Said aim is achieved by making the guide tracks, which consist of rails, extend in a straight line in the direction of the boot, parallel to the longitudinal axis of the vehicle, whereupon the support pillars of the roof part are displaceable thereon by means of guide carriages fixed to the support pillars and are rotationally guided about a transversal axis which is horizontal in respect to the longitudinal axis of the vehicle, and by allocating a separate control track with endless guiding means to each guide carriage in order to produce a combined translational and/or rotational movement of the support pillars. The guiding means are coupled to each other in a positive fit by means of a common shaft, which is driven by a drive mechanism, in order to produce a synchronous movement. When a rear stop is reached, the front end of the roof part can pivot into the accommodating area in a position which is approximately perpendicular to the rear of the seat group and the support columns can be lowered inside said accommodating area.

21 Claims, 14 Drawing Sheets

U.S. PATENT DOCUMENTS

| | | | |
|---|---|---|---|
| 3,021,174 A * | 2/1962 | Rund | 296/107.2 |
| 5,944,378 A * | 8/1999 | Mather et al. | 296/219 |
| 6,073,988 A * | 6/2000 | Huber et al. | 296/116 |
| 6,648,397 B1 * | 11/2003 | Schutt et al. | 296/107.16 |
| 6,682,125 B1 * | 1/2004 | Guillez et al. | 296/107.18 |
| 6,814,391 B1 * | 11/2004 | Biecker et al. | 296/108 |

FOREIGN PATENT DOCUMENTS

| | | |
|---|---|---|
| DE | 10212575 A | 10/2003 |
| FR | 2 722 151 | 1/1996 |
| JP | 62 163 822 | 7/1987 |
| JP | 62 198 517 | 9/1987 |
| JP | 1 106 725 | 4/1989 |

* cited by examiner

RETRACTABLE ROOF FOR PASSENGER VEHICLES, ESPECIALLY A HARD TOP FOR CONVERTIBLES, ROADSTERS OR SIMILAR

The invention relates to a retractile car roof, in particular a hard roof for a convertible, roadster, or the like with two or more seats, the roof having a rigid shell that has a main roof part and columns projecting fixedly downward at an obtuse angle from the rear of the main part, a rear window for a window opening, a storage compartment extending transversely of the vehicle axis immediately behind the seats and into which the main part and columns and the rear window and their guide and drive means are engageable, the main roof part with its columns being guided on a rail into its storage compartment.

German 36 342 058 and EP 0,261,379 describe a closable roof for a car having a one-piece rigid and stable roof element having when raised a generally horizontal upper roof region and side parts extending downwardly and back relative to the car and a pair of pivots on each of the two side parts or the rear of the roof that in a raised position of the roof are spaced apart somewhat below the vehicle body and that have a pair guide rails symmetrically on each of the two sides of the vehicle in which the pivots engage. The two guide rails of each pair have their upper ends spaced apart with the respective pivots and extend from there downward along similar paths so that their spacing decreases going down so as to produce an opening movement where the upper roof part is raised and then on further movement is dropped while generally vertical into its lower end position. The pivots in a first movement phase are moved in the guide rails downwardly along an arc so that the roof tips up with the upper roof part and the rear part pivots downward. The two rails that are fixed inside the car on the inside and that guide projections of the side parts via their pivots takes up quite a bit of space behind the seats and into the trunk area. Furthermore canting of the various guide elements is possible as a result of the difficult force distribution during opening and closing.

German 43 24 708 discloses a lowerable roof for cars, in particular for two-seater convertibles, having a shell forming a roof plate and rear roof posts and movable into a storage compartment between side walls of the vehicle body to which end it is oriented in a vehicle plane, forming a window opening for a rear window between a rear edge of the roof plate and the posts, and provided with guides for moving the roof plate and rear window so that the rear window can move from a lowered position relative to the roof plate into a lower position in which its edges are closely juxtaposed with the roof plate. The roof shell can drop down in lateral storage compartments via guides that are independent of the guides of the rear window and longitudinally slidable in the roof shell.

The two guide rails on the inner wall of the car that guide pivots or pins take up a great deal of space behind the seat and into the trunk area. In addition canting of the various guide elements is possible as a result of how the forces are applied during opening and closing. High surface pressures are created that make it difficult to operate the roof.

In addition German 40 38 074 describes a lowerable roof for cars, in particular a hard roof for a convertible, having roof posts to each side of a rear window of the roof that seen from the side with a storage position of the lower roof in a storage compartment in which the forward longitudinal regions of the roof form an obtuse angle underneath the roof posts and into which the roof can be lowered in which case the roof is tipped into the storage compartment. The rear window forms with the roof raised between the roof posts the rear part of the roof and can be moved from this position into a storage position in which with the roof lowered it is stowed above the lower ends of the roof posts. The roof is mounted on the motor-vehicle body by a pair of linkages that symmetrically flank the vehicle center plane and whose upper ends are pivoted at lower ends of the roof posts and that each include at least one guide link extending along an angled line to the rear window that is pivoted at its upper edge on the roof and at its lower end on the body of the vehicle. With this known solution parts of the passenger compartment are taken up by the lowering and raising process as a result of the relatively bulky linkages. The linkages are also mechanically expensive and failure-prone.

U.S. Pat. No. 2,191,2690 describes a lowerable roof without rear posts for a convertible, wherein a raising and lowering mechanism formed by large and small rollers is provide that extends behind and partially below the seats. The raising and lowering mechanism is very likely to jam as a result of the roller drive and takes up all the space behind the seats.

All the known lowerable roof of the prior art achieve the required structural rigidity by being relatively massive, and are mechanically complex and expensive.

It is an object of the invention, in view of this state of the art, to improve on a lowerable roof of the above-described type such that the necessary structural rigidity is achieved with less weight, easier operation, and more mechanical simplicity and usability while also taking up less space.

This object is achieved by a roof of the above-described type having the features of the characterizing clause of claim 1. Preferred embodiments of the roof are seen in the dependent claims.

The roof according to the invention is characterized in that as a result of a simplification of the kinematics of the guiding of the roof part parallel to the vehicle axis along the rear quarter panels there is sufficient room for the storage compartment with its columns immediately behind the rear seat. The roof according to the invention only needs for each column a straight guide rail extending toward the trunk along the upper region of each rear quarter panel and a control track. In this manner space and weight are conserved.

The roof according to the invention can, in spite of its small mass, be structurally quite stiff, and provides when closed the same comfort as a hard-top coupe. It saves space, is easy to use and service, and does not interfere with visibility toward the rear.

The invention is more closely described in the following with reference to two embodiments.

Therein.

EXAMPLE 1

Figure 1:
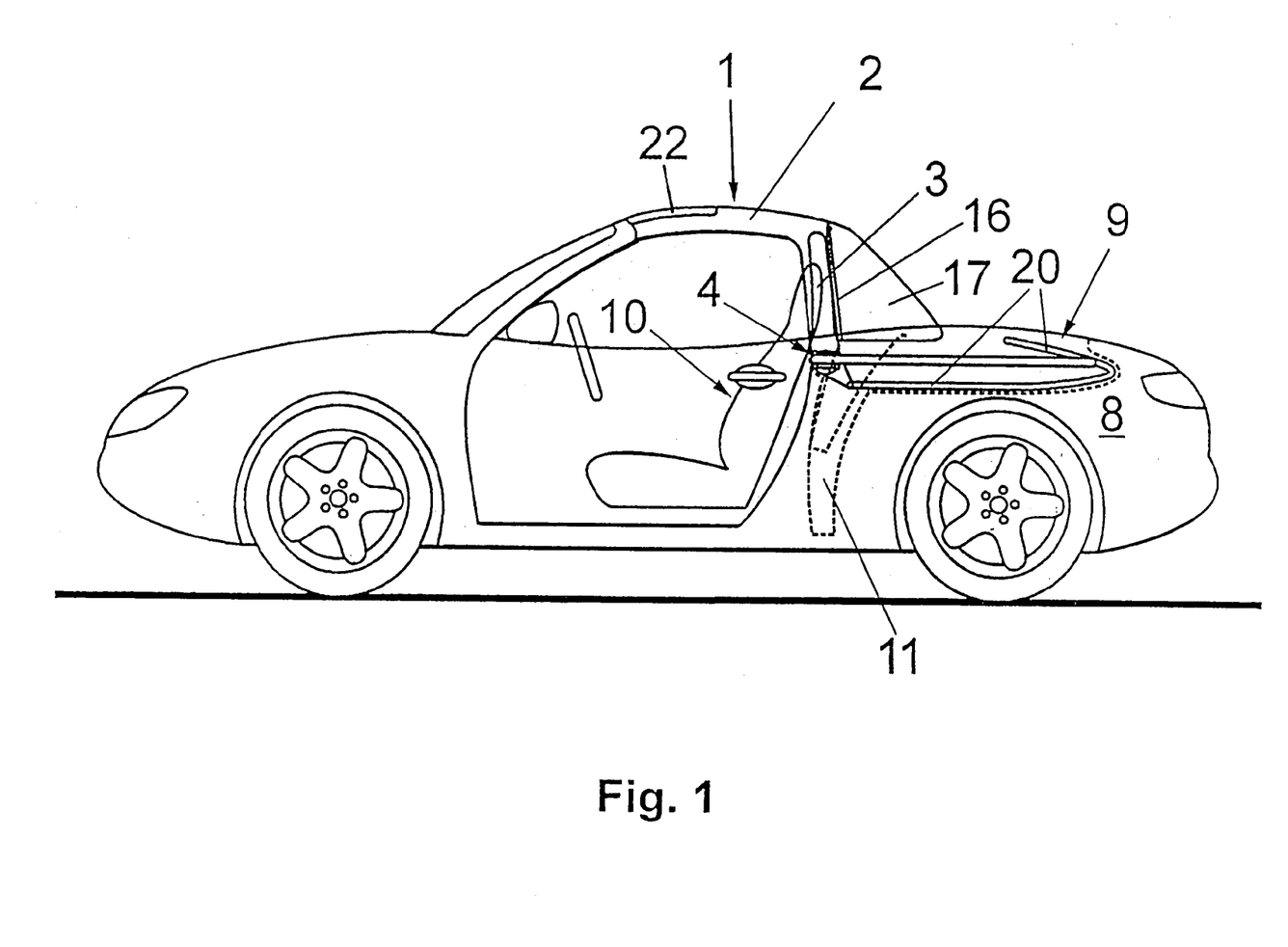
FIG. 1 is a longitudinal section through a two-seater convertible with its roof raised.

FIG. 1 shows by way of example a two-seater convertible having according to the invention a roof 1. It is comprised of a rigid shell forming a front main part 2 from whose rear corners two support columns 3 extend downward at an obtuse angle, diverging outwardly. The support columns 3 are narrow and flat and mainly act as supports. Lower ends 4 of these columns 3 are fixed to respective guide slides 5 that have rollers or slide pads. The guide slides 5 make four-point contact with rails 6 that are fixed on support plates 7 oriented vertically and extending parallel to the vehicle longitudinal axis. Each support column 3 is guided only on one rail 6 by one guide slide 5 that moves in a straight line on the rail 6. The rails 6 have hard surfaces so they are wear resistant, and they define straight guide paths FB that extend parallel to the vehicle longitudinal axis along upper regions of the rear quarter panels 9. The lower end 4 of each column 3 carries a pin 19. These pins 19 ride in control tracks 20 that are fixed to plates 21 that extend parallel to the support plates 7. The control tracks 20 each have a straight part and a curved part. Behind the seats 10 the roof can fit into a storage compartment 11 that according to the invention has a shape determined by the movement arc of the roof part 2 and the columns 3 during lowering and raising.

Figure 2:
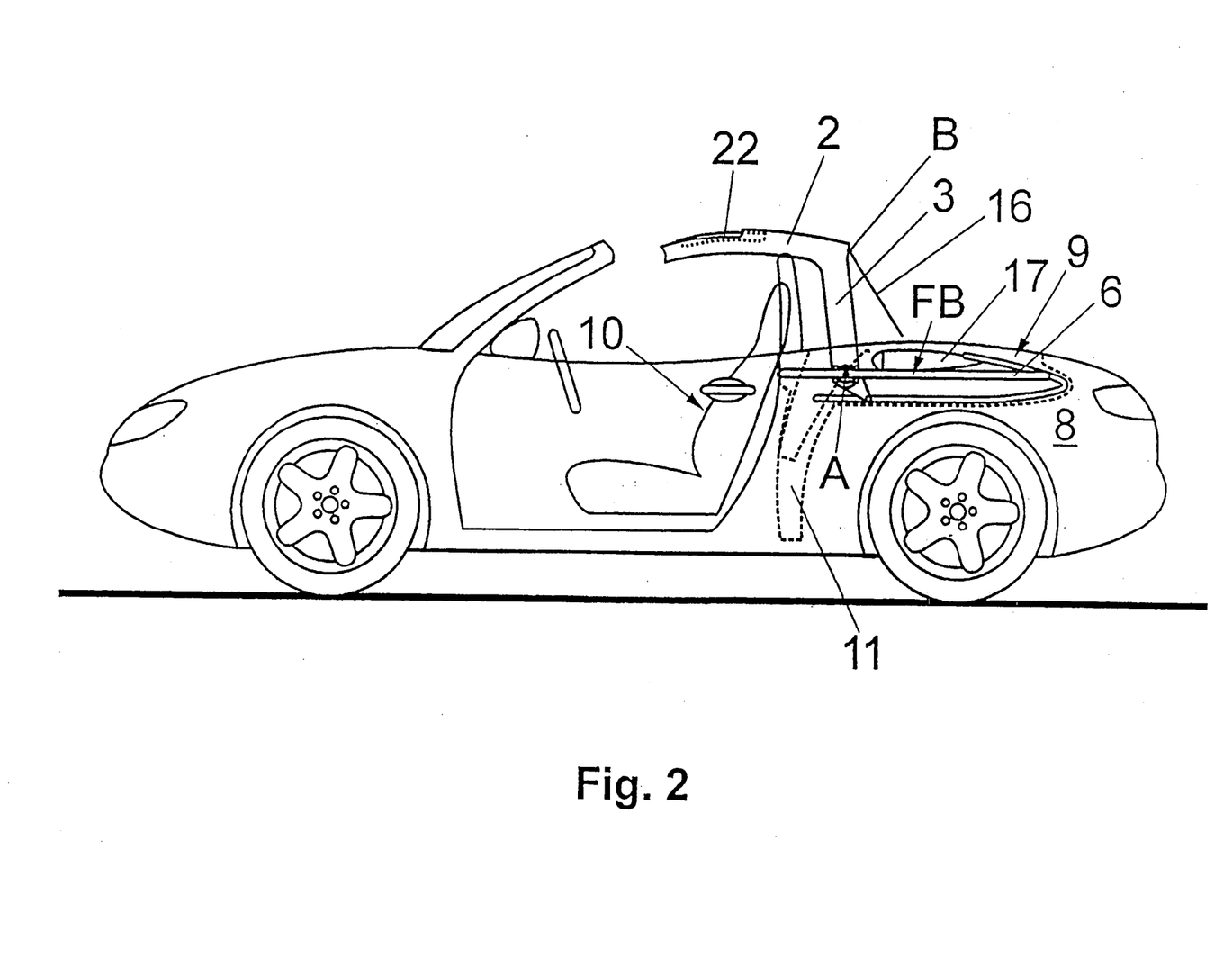
FIG. 2 is a longitudinal section through the convertible at the start of the lowering operation with straight-line movement toward the trunk.
Figure 3:
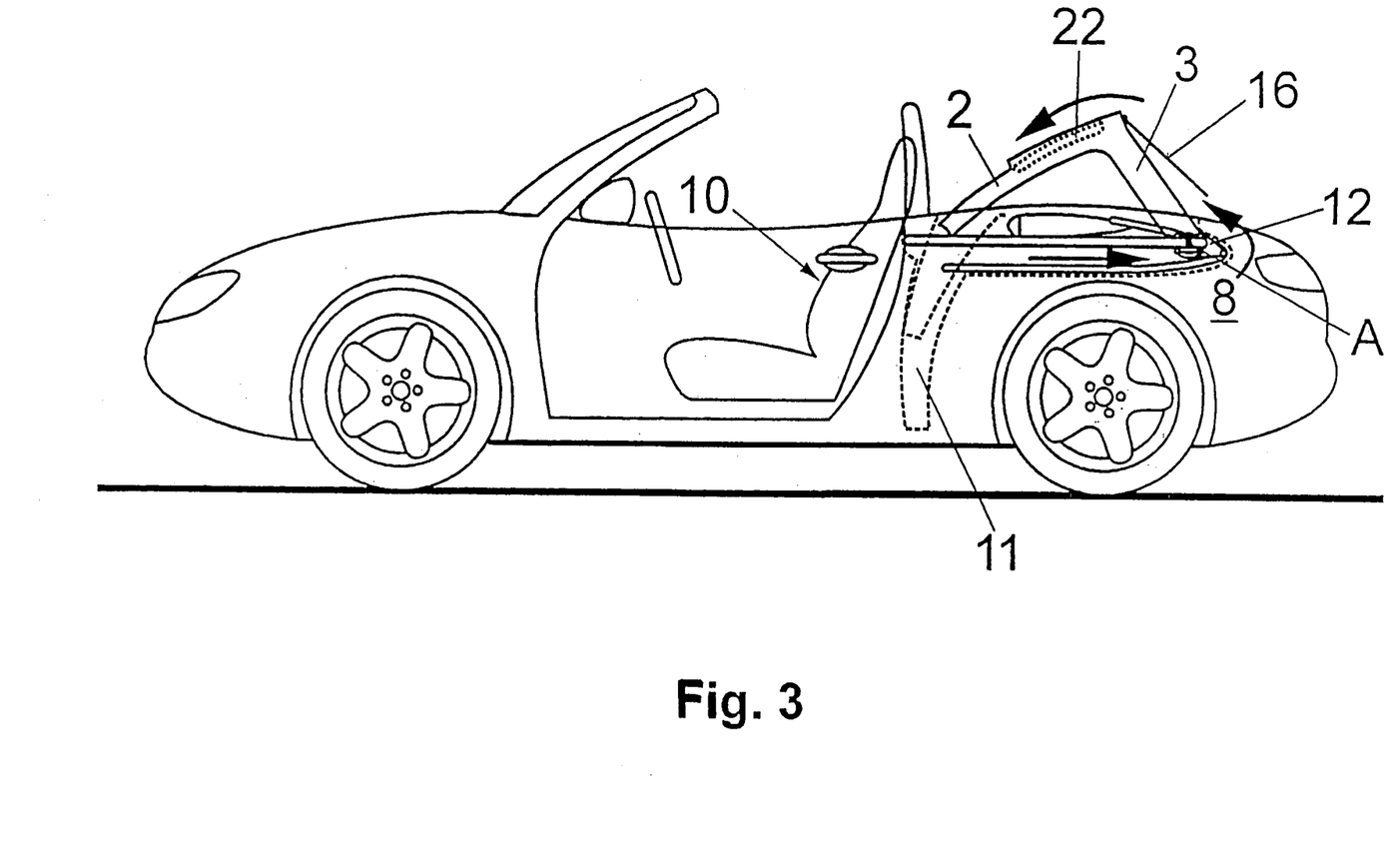
FIG. 3 is a further longitudinal section through the convertible showing the lowering operation at the rear end position with the rear window in place.
Figure 4:
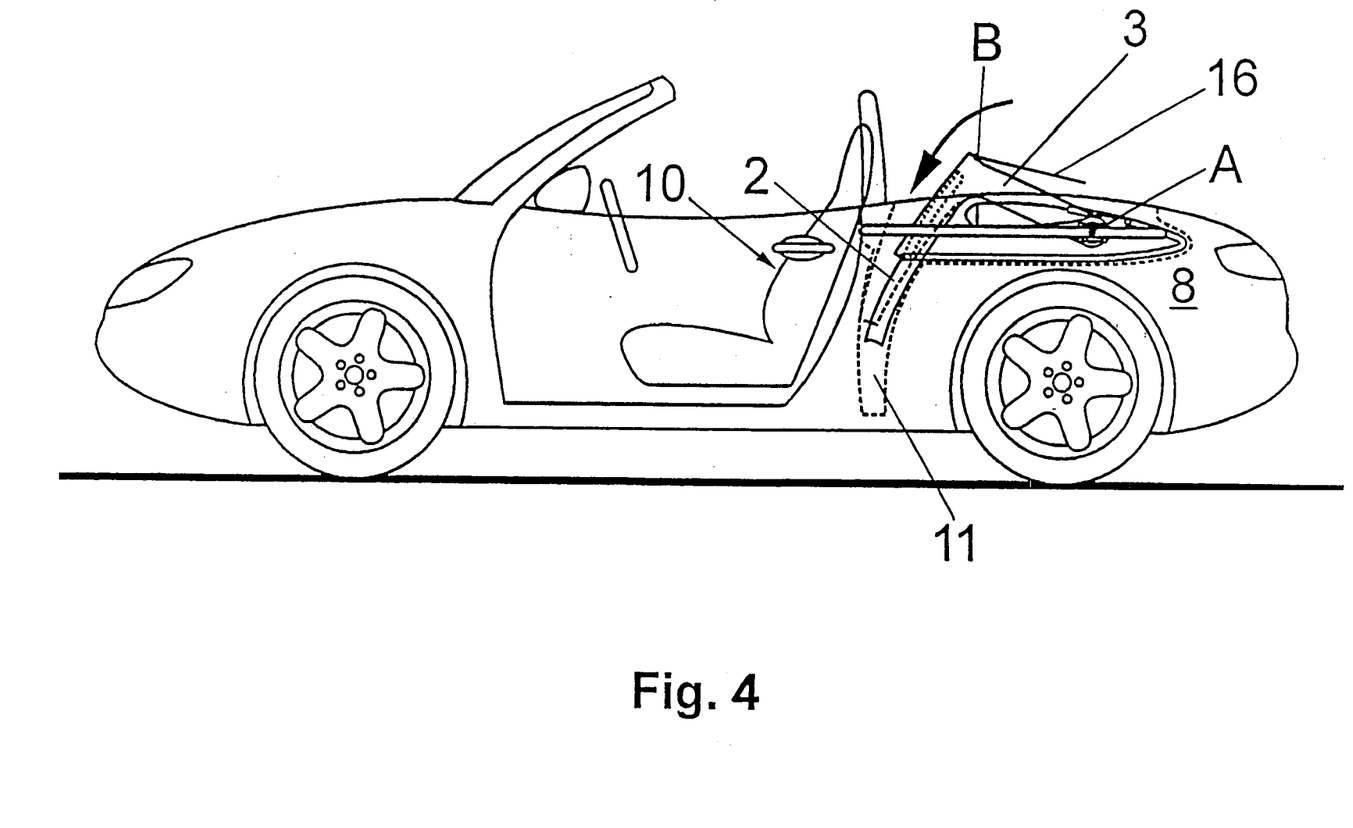
FIG. 4 is a further longitudinal section through the convertible at the start of the swinging/pivoting movement and insertion into the storage compartment.

FIG. 2 shows the start of the horizontal sliding of the roof part 2 with its columns 3. Both guide slides 5 move along the respective rails 6 toward the rear stops 12. The pins 19 are pulled by inextensible entraining elements, for example steel chains, along the tracks 20. So long as the pins are in the straight track part, the roof moves purely in a straight line. This part extends to a point at which the front edge of the roof shell is rearward of the passenger compartment and a roll bar 28. As the pins 19 move into and travel along the curved track part, the roof is pivoted about the axis A of the slides so that the roof part 2 is swung or pivoted downward into the storage compartment 11. The roof part is positioned at the end of its downward travel in an upright position behind the back of the seats 10.

Figure 6A:
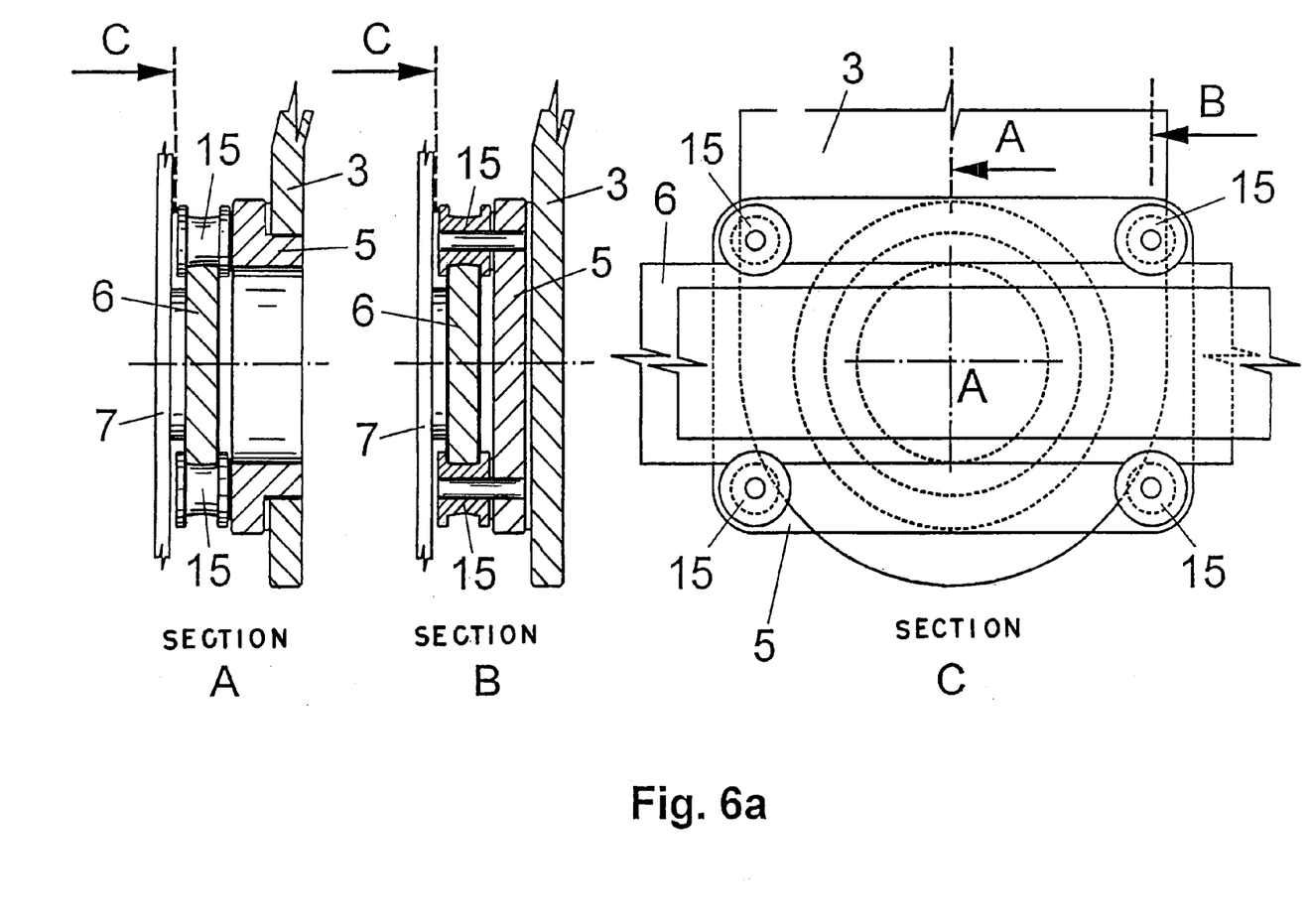
FIGS. 6a and 6b are two variants on the structure of the support slide.
Figure 6B:
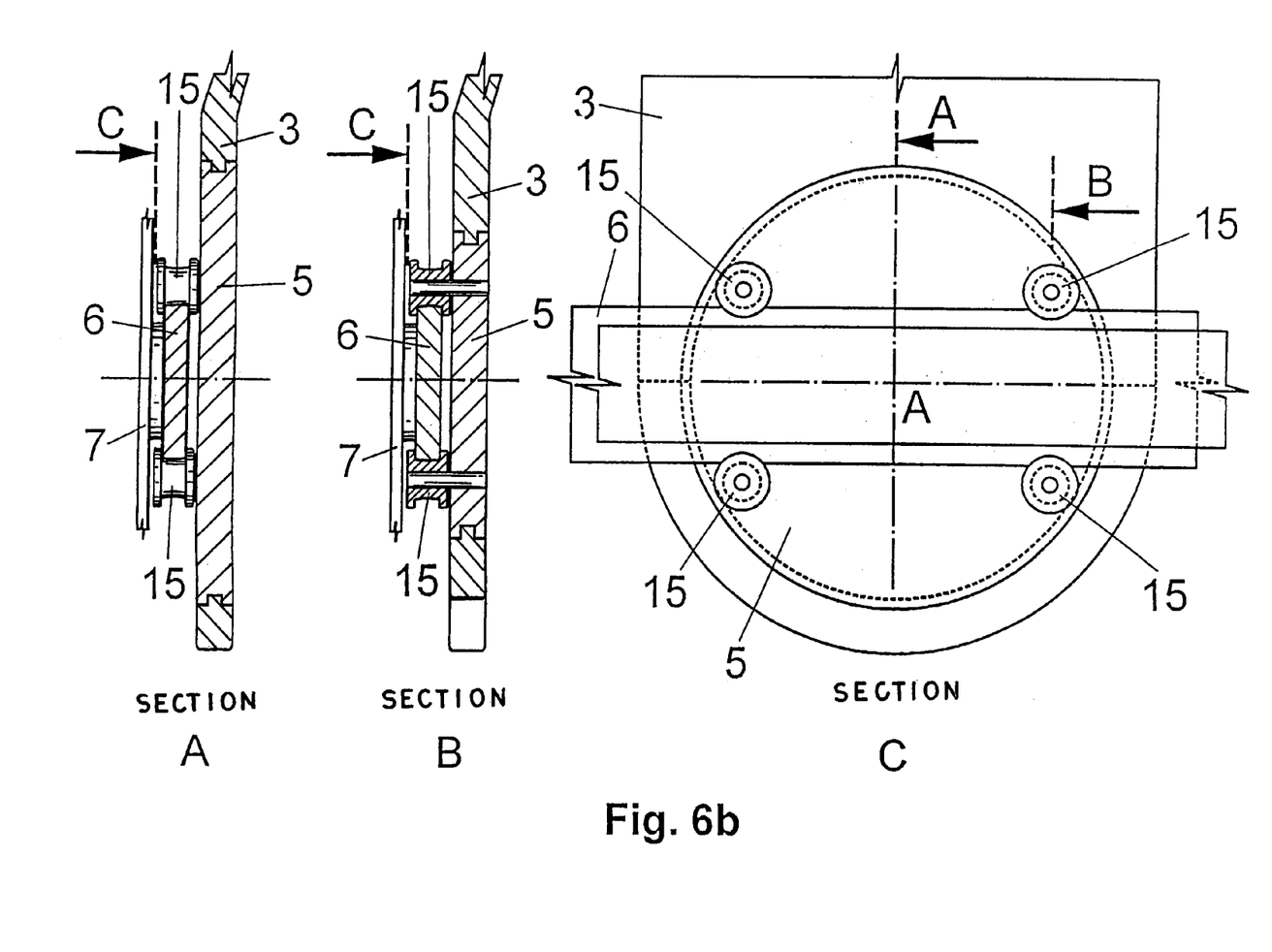

FIG. 6a shows a variant of the guide slide 5 with four rollers 15, the slide being at the column foot. FIG. 6b shows a further variant in which the slide is integrated into the column foot.

Figure 7A:
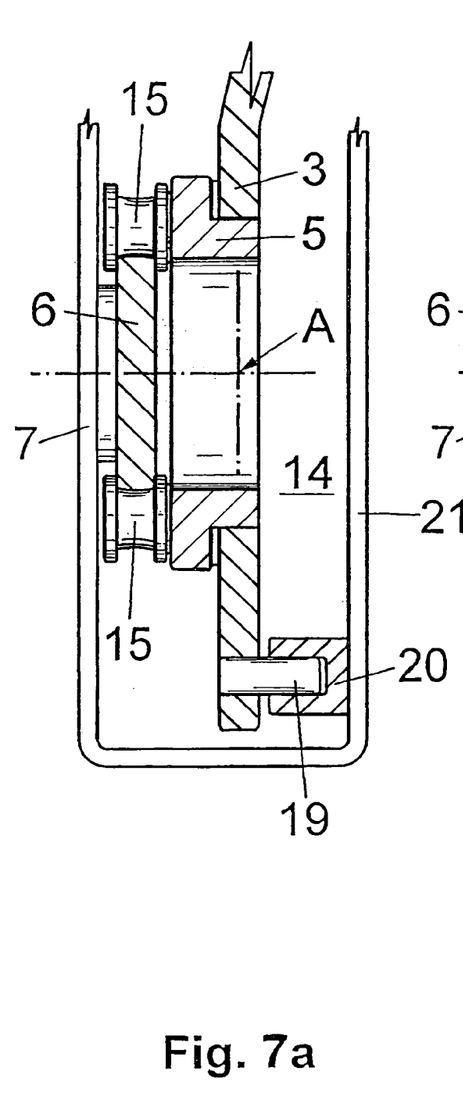
FIGS. 7a and 7b show the guide rail and control track in the storage compartment for the support columns according to FIGS. 6a and 6b.
Figure 7B:
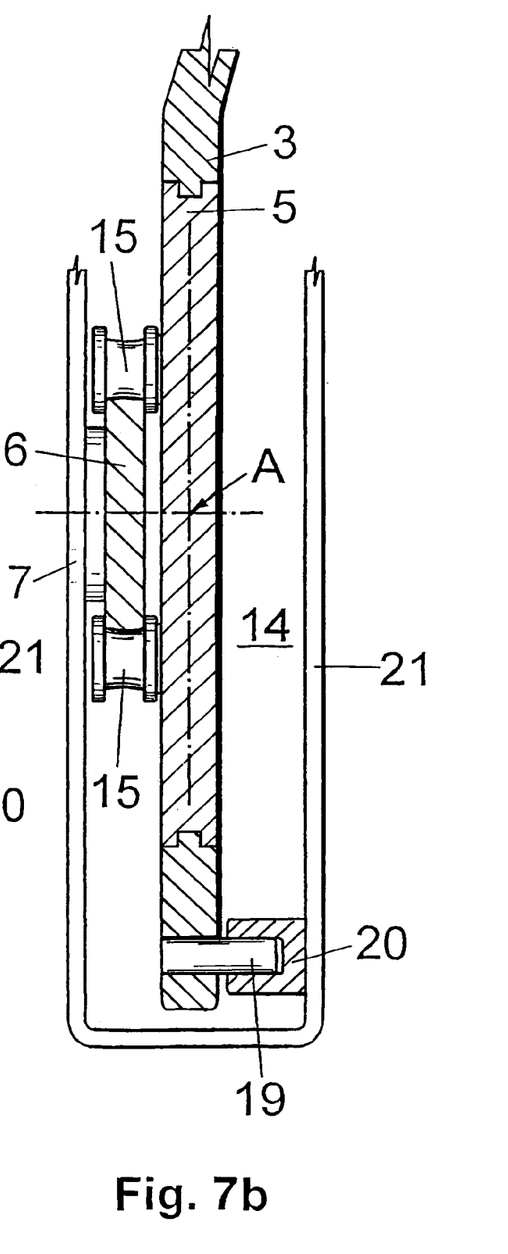

The rails 6 and the tracks 20 each lie as shown in FIGS. 7a and 7b in the bottom of a compartment 14 of the upper rear quarter panel 9, on whose outer vertical wall 15 formed by the support plate 7 the rail 6 is secured and whose on inner vertical support plates 21 the track 20 is secured. The compartment 14 is dimensioned such that the columns 3 fit in it when the roof part 2 is lowered into the compartment 14.

Figures 8A, 8B:
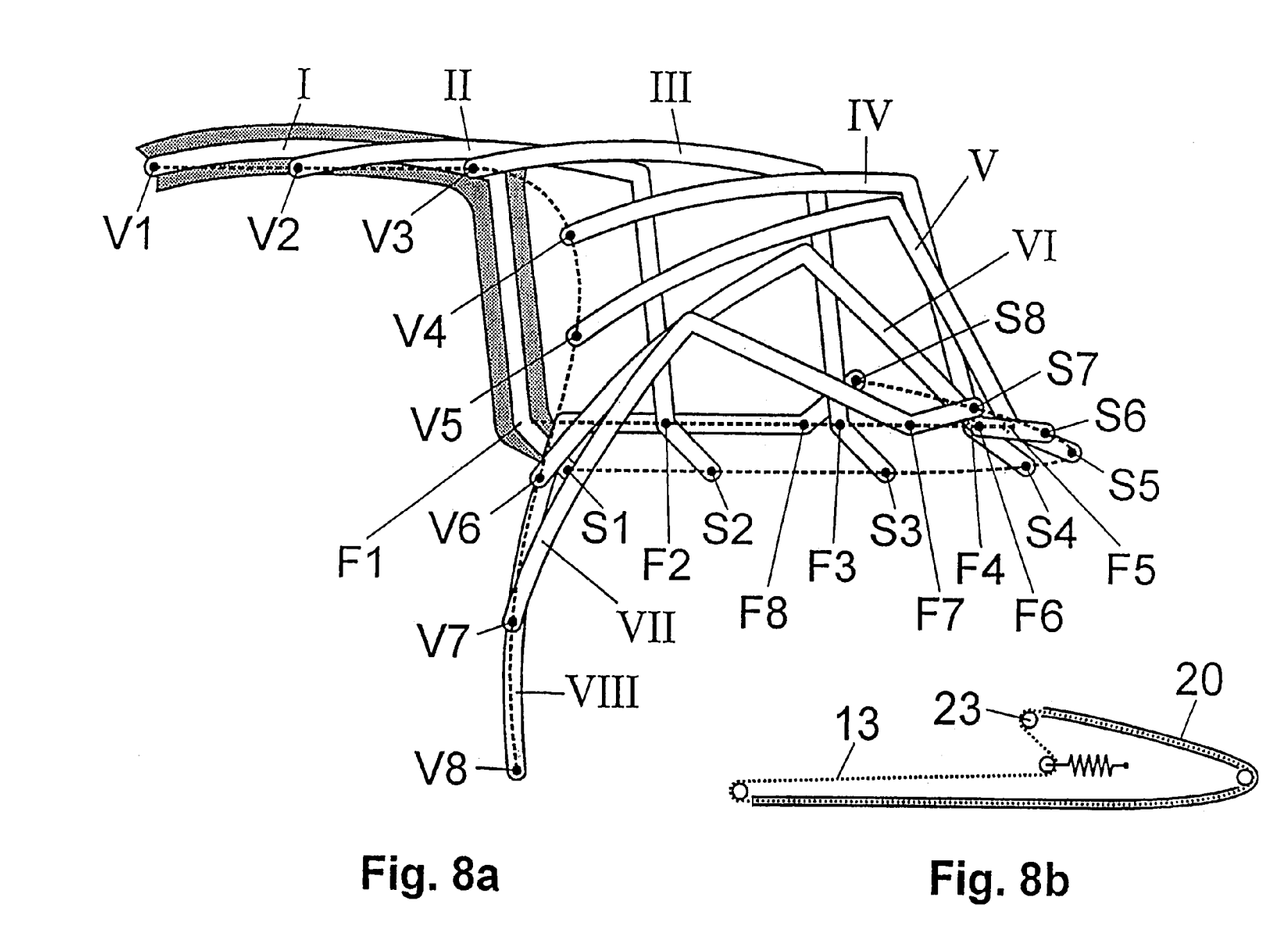
FIGS. 8a and 8b schematically show the movement path of the roof.

FIGS. 8a and 8b show the straight-line and pivotal movement of the roof part 2 with its columns 3. The guide slides 5 move along the rails 6 and pass through points F1 to F8. The pins 19 ride in the tracks 20, pass through the points S1 through S8, and are attached to the entrainment element 13.

On lowering, the pins move from point S1 via point S2 to point S3. This part of the control track is straight and parallel to the rails 6. The slides 5 at the same time move through points F1, F2, and F3, with the roof moving in a straight line parallel to the vehicle longitudinal axis. Simultaneously the front roof edge moves through points V1, V2, and V3. It passes the passenger compartment and the roll bar fixed on the vehicle body.

The curved part of the control track 20 starts at point S3. The pins move between the points S3 and S5 along a path that vertically converges with the control track. The slide 5 moves through the points F3 to F5. The roof thus pivots downward about the axis A while also moving translatorily. The roof front edge at this time traverses points V3 to V5. The point S5 is the rear end of the control track 20. As soon as the pins pass this point, the slides 5 have reached the stop points 12 and the roof moves purely pivotally. As the pin moves further to the point S8, the slide 5 moves forward through points F5 through F8. The front roof edge dips in a combination pivoting straight-line movement into the storage compartment 11. This movement conforms to the shape of the roof and allows the storage compartment 11 to be optimally minimized in size. The points F1 to F8 are the momentary positions of the pivot axis of the slide 5.

Figure 9:
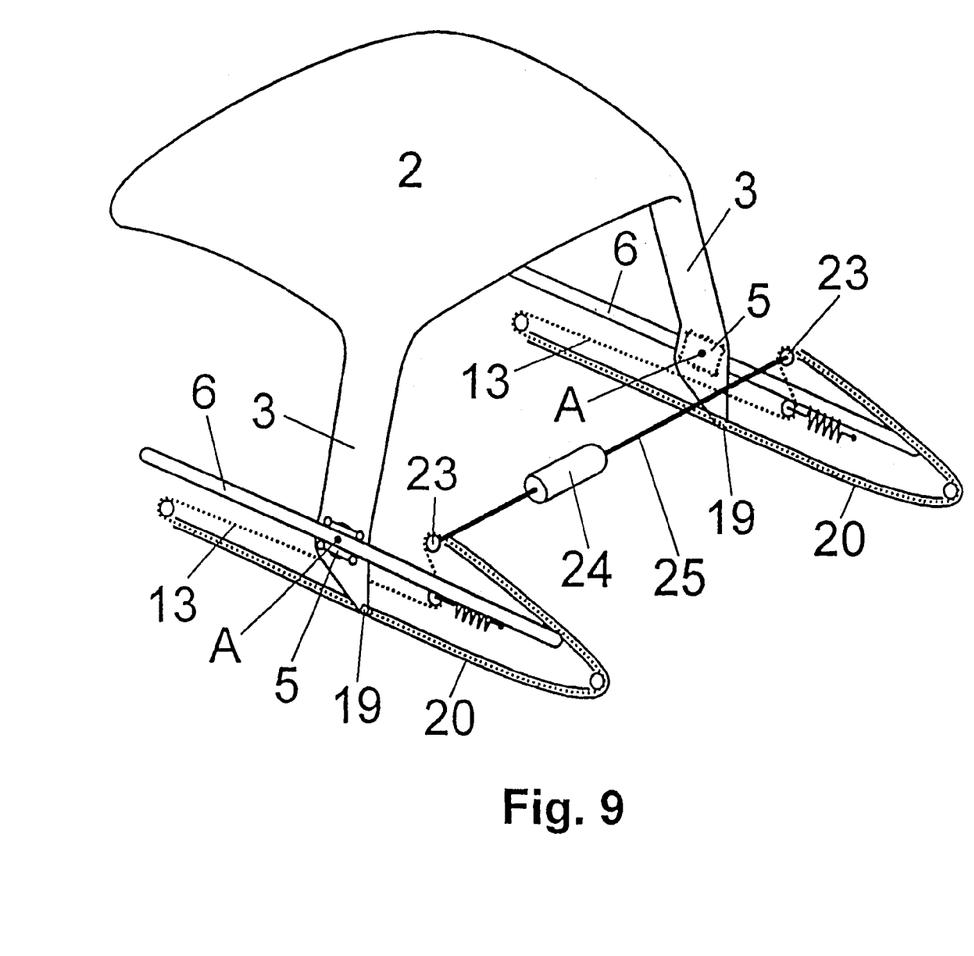
FIG. 9 is a perspective view of the operating mechanism of the roof.

FIGS. 8b and 9 show the endless entrainment elements 13, here steel chains, spanned over sprockets 23 that are connected together by a common shaft 25 and driven by a motor 24. Tipping of the roof part 2 about the pivot axis A facilitates good force transmission to the slide 5 via the pin 20 over the entire path of travel.

Figure 5:
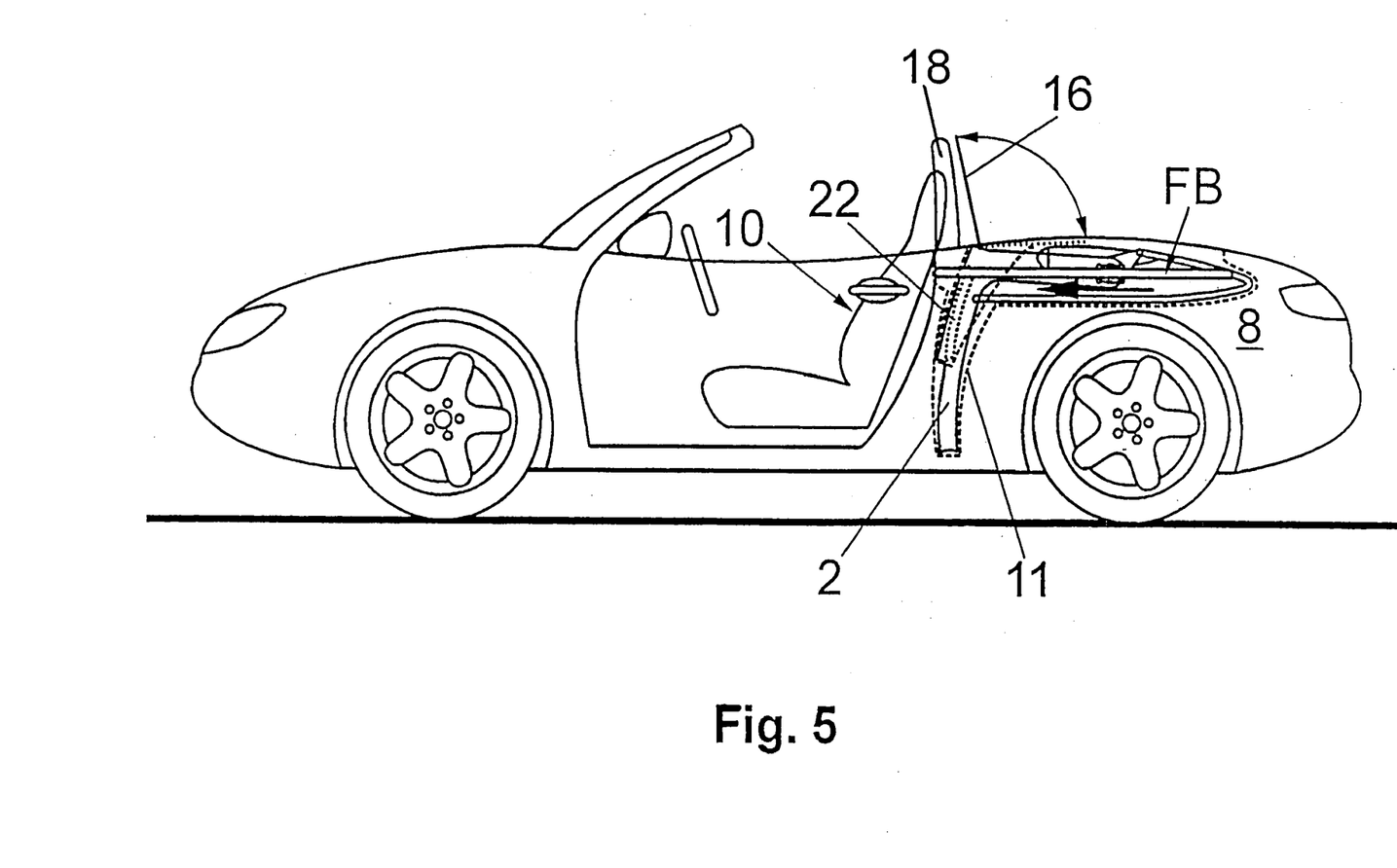
FIG. 5 is a longitudinal section through the convertible at the end of the lowering operation into the storage compartment.

The rear window 16 is pivotal at a rear edge of the roof shell about a horizontal transverse axis B and is of downwardly flaring trapezoidal shape and planar. It can as shown in FIG. 5 be pivoted up into a windshield position when the roof is down. The roof 1 fits with its front edge with the upper frame of the windshield. Actuation of the roof 1 is effected by standard drives and can be wholly automatic. In its raised position the columns 3 of roof 1 are also supported by braces 17. These braces 17 are pivotal, swingable, or hinged on the vehicle body. The braces 17 optimize aerodynamics, reduce wind resistance and wind noise, and impart a coupe-like look to the vehicle.

In order that the roof part 2 when lowered leaves sufficient room for an unillustrated drive, a front region 22 of the roof part 2 slides under a rear part of the roof part 2. The slidable part of the roof part and its support structure are made rotation symmetrical to a horizontal transverse axis of the vehicle so that the guide elements can be made very compact and light.

Figure 10:
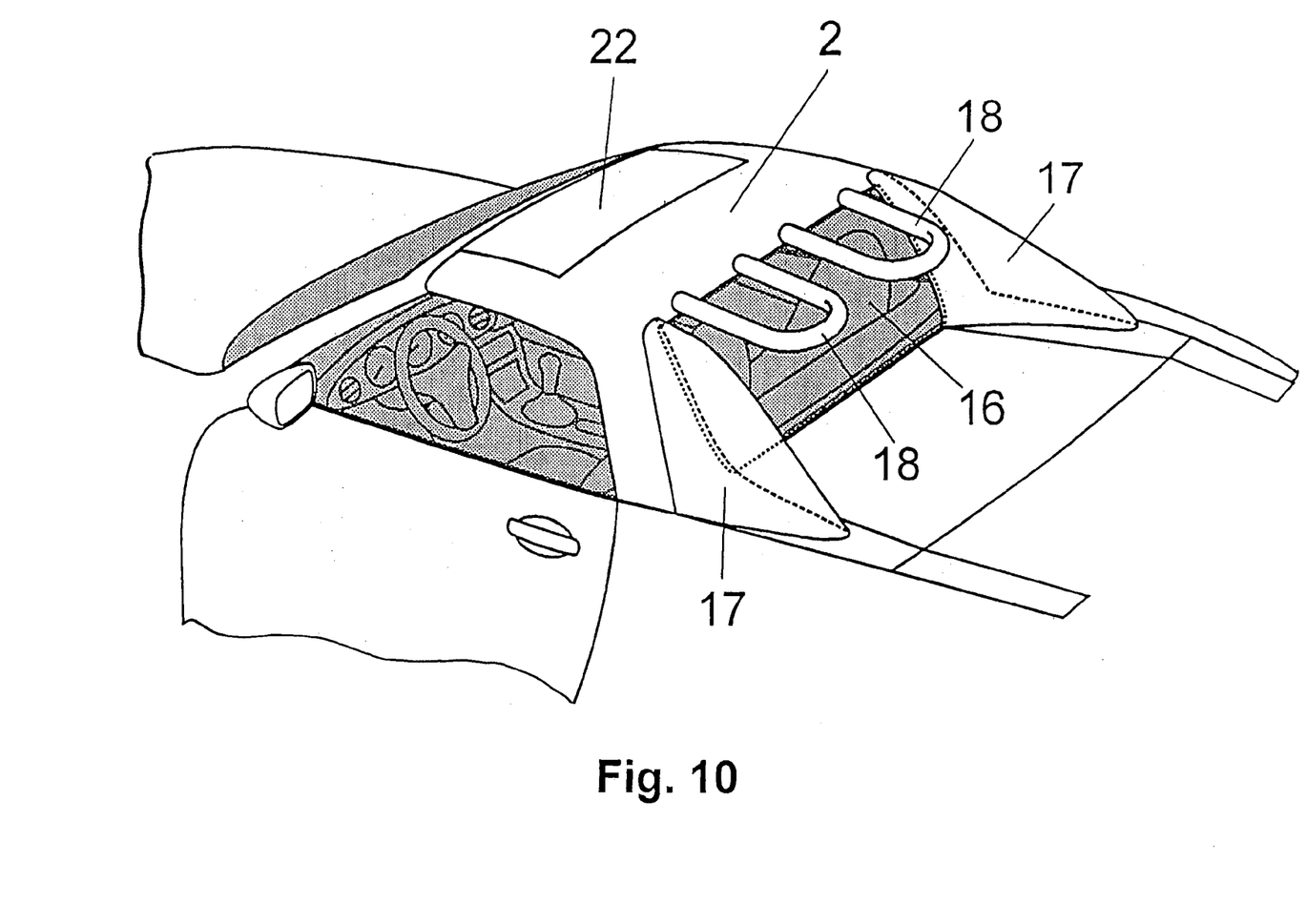
FIG. 10 is a perspective view of a convertible with a variant of the roof with an integrated roll bar.
Figure 11:
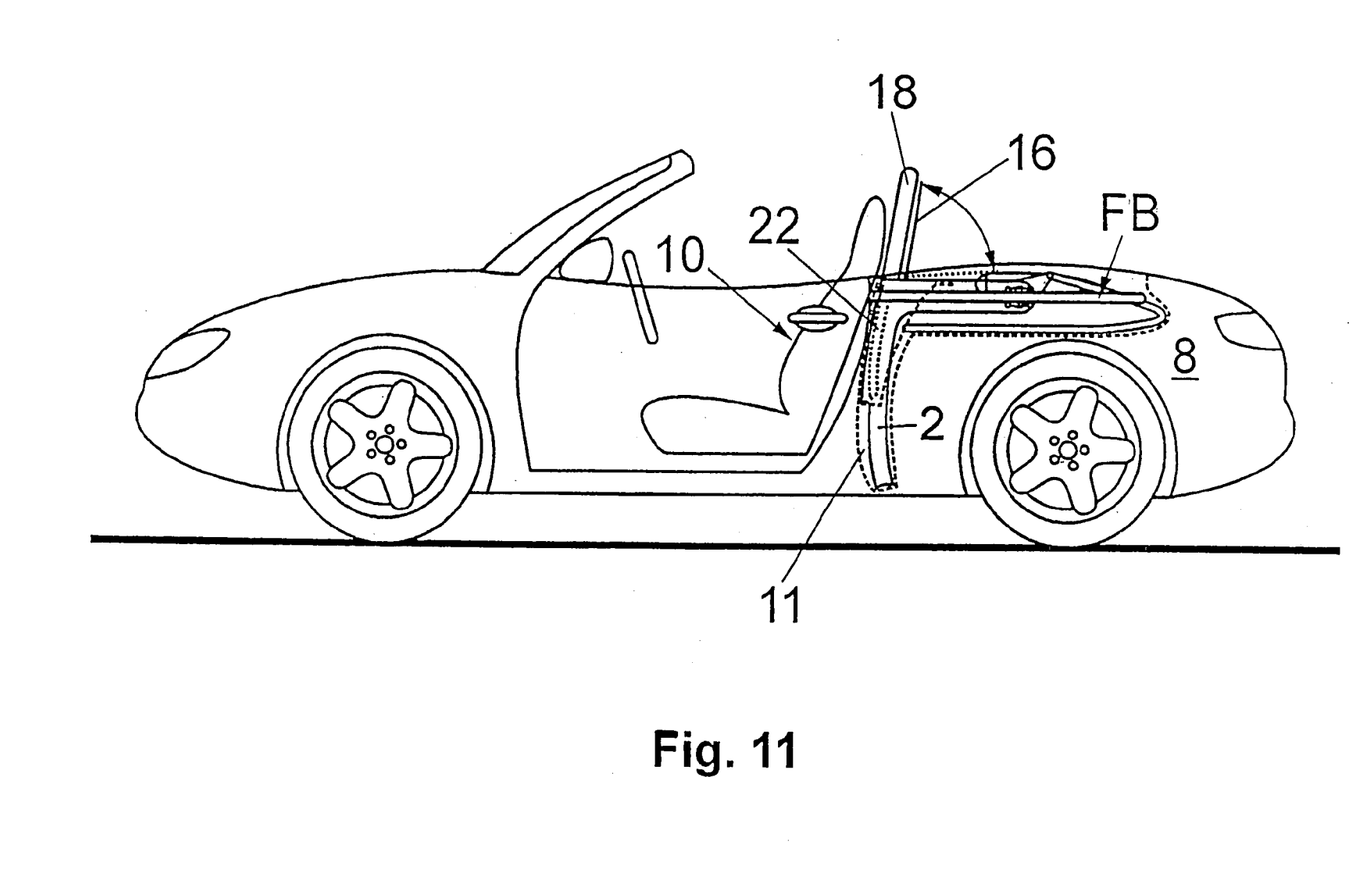
FIG. 11 is a longitudinal section through the convertible with the roof down with the integrated roll bar.

FIGS. 10 and 11 show a variant in which the rear part of the roof part 2 carries the roll bar 18. The rear window 16 can also be swung up in this system for windscreen use when the roof is down. When the roof 1 is up, the rear window 16 bears against a seal that is mounted on the vehicle body. The rear window 16 itself can alternatively be provided with the seal.

EXAMPLE 2

Figure 12:
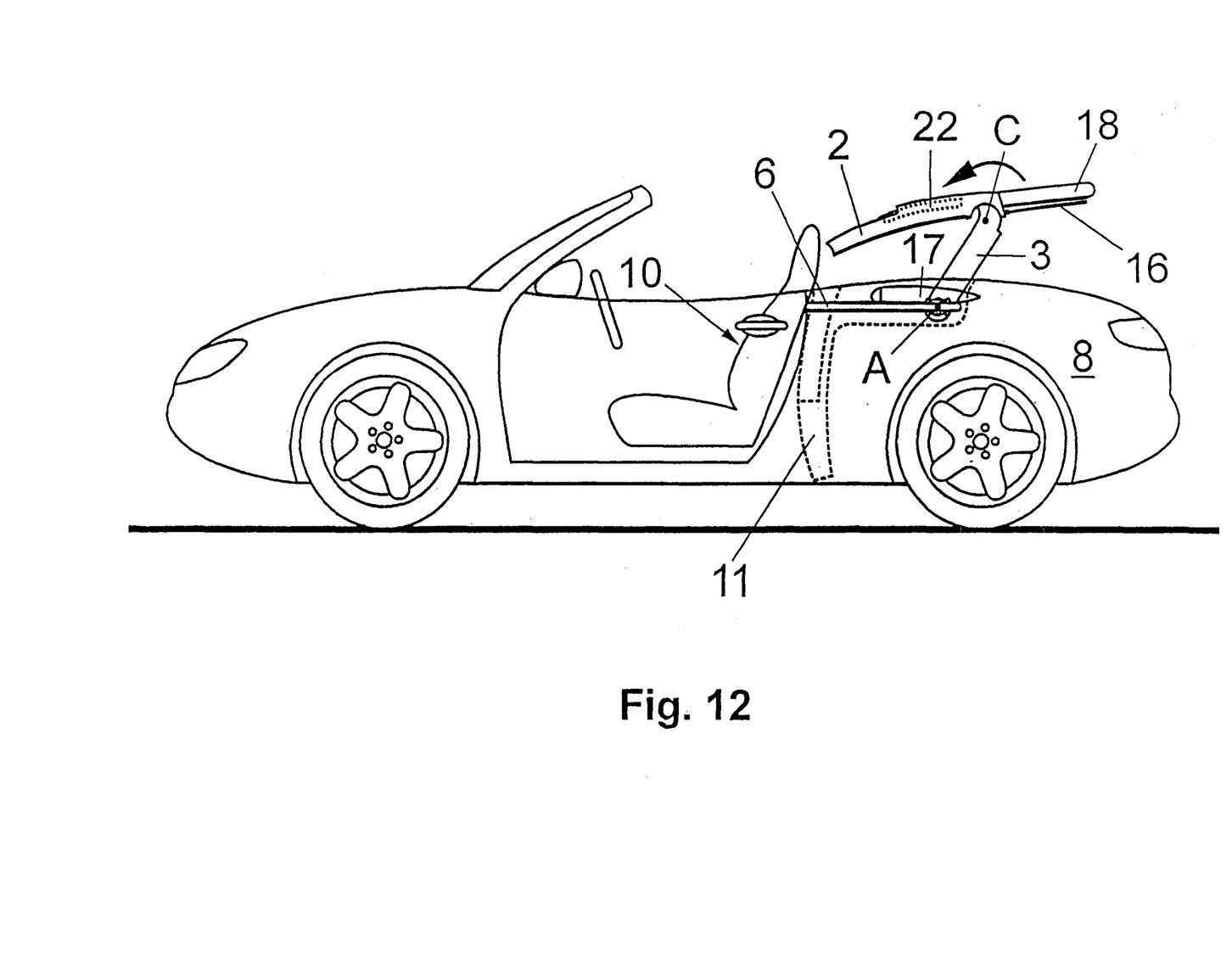
FIG. 12 is variant of the roof with pivots between the rear part of the roof and the support columns.

FIG. 12 shows a longitudinal section through a convertible with a roll bar integrated into the rear part of the roof, the columns being transversely connected to form a bend- and torsion-resistant U-shaped frame on which the roof part 2 is pivoted about a horizontal transverse axis C. This variant makes it possible to substantially shorten the lengths of the rails 6 and to make the storage compartment for the roof substantially smaller. To this end the columns 3 are inclined at a larger angle to the axis A than in example 1.

A plurality of pins 19 traveling in respective guide slots 20 ensure good transmission of drive force to the slides 5. In each position at least one pin 19 ensures good transmission of the driving force at the axis A. Pivoting of the roof is effected by the columns 3 acting as links between the transverse axes A and C. Other than these difference, the roof according to the invention corresponds to that of example 1.

Figure 13:
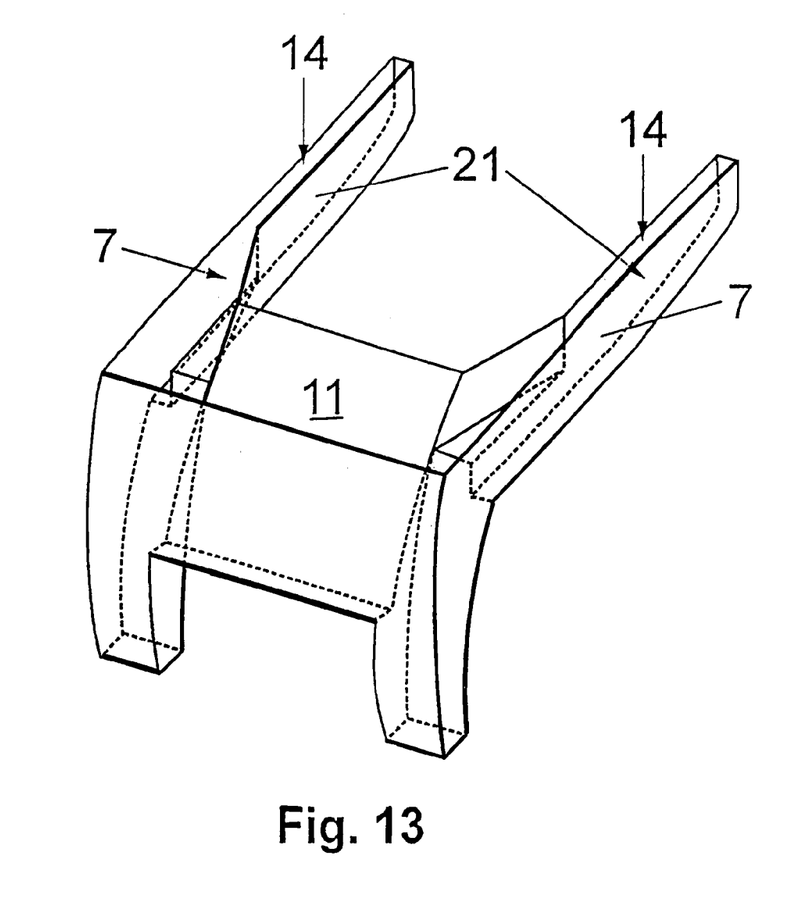
FIG. 13 is a perspective view of a storage compartment.

FIG. 13 shows the storage compartment in perspective view, with the position of the support plates 21 for the tracks 20 and the vertical inner walls of the compartment 7 for the columns 3.

PARTS LIST—23053 roof 1
front main part 2
support columns 3
lower column ends 4
guide slides 5
rails 6
support plates 7 oriented
trunk 8
quarter panel 9
seats 10
storage compartment 11
rear stop 12.
entrainment element 13
compartment 14 for columns 3
rollers 15 of slide 5
rear window 16
braces 17
roll bar 18
pin 19
control tracks 20
plates 21 for tracks 20
front retractile roof region 22
sprockets 23 for driving entrainment element 3
drive motor 24
shaft 25
straight track part FB
pivot axis of 5 A
pivot axis of 16 B
transverse axis C
slide positions F1 . . . F8
pin positions S1 . . . S8
roof-edge position V1 . . . V8

The invention claimed is:

1. In a convertible motor vehicle adapted to move in a normal travel direction and having a seat and a storage compartment extending transversely of the direction behind the seat, the improvement comprising:
a rigid roof shell having two rear end posts defining a rear opening;
two guide rails extending in the direction and transversely spaced from each other on the vehicle rearward of the storage compartment;
respective guide slides displaceable along the guide rails between front and back end positions, the posts being pivotal on the slides about a horizontal axis extending transversely of the direction;
a drive shaft extending transversely of the direction between the slides;
respective entrainment elements spanned over the drive shaft and connected to the slides;
drive means connected to the roof shell and to the shaft for synchronously displacing the slides between their end positions and pivoting the shell on the slides for shifting the shell between an up position with the shell extending horizontally in the direction forward of the seat in the front end positions of the slides into a down position with the shell extending vertically in the compartment in the rear end positions of the slides; and
a rear windshield displaceable into a raised position fitting between the rear end posts of the windshield in the up position thereof and closing the rear opening.

2. The improvement defined in claim 1 wherein the rear windshield is pivotal on a rear end of the shell between the raised position and a lowered position.

3. The improvement defined in claim 1 wherein the roof shell is pivotal on upper ends of the posts about a horizontal axis extending transverse to the direction.

4. The improvement defined in claim 1 wherein the posts are provided with reinforcement braces.

5. The improvement defined in claim 4 wherein the reinforcement braces are pivotal between a bracing position bearing on both the respective posts and a body of the motor vehicle and an out-of-use position not bearing on both the respective post and the vehicle body.

6. The improvement defined in claim 1, further comprising:
drive means including a motor connected to the slides for displacing the slides between their end positions.

7. The improvement defined in claim 1 wherein the roof shell has front and rear parts and includes means for displacement of the front part between a front position mainly forward in the direction of the rear part and a rear position with the front part vertically aligned with and stowed on the rear part.

8. The improvement defined in claim 1 wherein the rear windshield is pivotal at windshield axis on a rear end of the shell between the raised position and a lowered position and is formed generally as an isosceles trapezoid tapering away from the windshield axis.

9. The improvement defined in claim 1 wherein the rear windshield is arcuately curved and centered generally on a horizontal axis extending transversely of the direction and is forwardly concave in the raised position.

10. The improvement defined in claim 1 wherein the rear windshield is pivotal into the raised position in the down position of the roof shell.

11. The improvement defined in claim 1, further comprising
a compressible seal between a periphery of the rear windshield and the roof shell and posts in the raised position of the windshield and up position of the shell.

12. The improvement defined in claim 1 wherein the roof shell has a front edge provided with a roll bar, the roll bar projecting upward behind the seat in the down position of the roof shell.

13. The improvement defined in claim 1 wherein the roof shell has a front edge provided with a roll bar, the roll bar projecting upward behind the seat in the down position of the roof shell.

14. The improvement defined in claim 1 wherein the guide rails are profiled.

15. The improvement defined in claim 1 wherein the slides have rollers riding on the respective rails.

16. The improvement defined in claim 1 wherein the posts have lower ends pivoted on the respective slides.

17. The improvement defined in claim 1 wherein the entrainment element is flexible and endless and the shaft is provided with wheels over which the elements are spanned.

18. The improvement defined in claim 1 wherein the drive means includes a motor connected to the shaft.

19. The improvement defined in claim 1 wherein the rear windshield is displaceable into a lowered position recessed in the vehicle.

20. The improvement defined in claim 19 wherein the rear windshield is pivotal between the raised and lowered positions.

21. The improvement defined in claim 1, further comprising windshield rails along which edges of the windshield is shiftable on movement into and out of the raised position.

* * * * *